(12) United States Patent
Vogel et al.

(10) Patent No.: US 8,857,131 B2
(45) Date of Patent: Oct. 14, 2014

(54) METHOD FOR ERECTING A TOWER, AND TOWER

(75) Inventors: Markus Vogel, Oldenburg (DE); Jens Hofmann, Biederitz (DE)

(73) Assignee: Aloys Wobben, Aurich (DE)

( * ) Notice: Subject to any disclaimer, the term of this patent is extended or adjusted under 35 U.S.C. 154(b) by 0 days.

(21) Appl. No.: 13/318,762

(22) PCT Filed: May 5, 2010

(86) PCT No.: PCT/EP2010/056087
§ 371 (c)(1),
(2), (4) Date: Jan. 23, 2012

(87) PCT Pub. No.: WO2010/128075
PCT Pub. Date: Nov. 11, 2010

(65) Prior Publication Data
US 2012/0124919 A1 May 24, 2012

(30) Foreign Application Priority Data
May 5, 2009 (DE) .......................... 10 2009 019 709

(51) Int. Cl.
*E04B 1/35* (2006.01)
*E02D 27/32* (2006.01)
*F03D 1/00* (2006.01)

(52) U.S. Cl.
CPC .............. *F03D 1/001* (2013.01); *F05B 2260/30* (2013.01); *F05B 2230/608* (2013.01); *Y02E 10/728* (2013.01); *F05B 2240/912* (2013.01)
USPC .............. 52/745.17; 52/99; 52/126.4; 52/296; 405/229; 405/230

(58) Field of Classification Search
USPC ........... 52/98, 99, 126.1, 126.3, 126.4, 126.7, 52/296, 297, 745.17; 405/229, 230; 416/DIG. 6
See application file for complete search history.

(56) References Cited

U.S. PATENT DOCUMENTS 2,240,016 A * 4/1941 Pinney ............................ 52/296
3,521,413 A * 7/1970 Scott et al. ........................ 52/98
(Continued)

FOREIGN PATENT DOCUMENTS

CN 1965165 A 5/2007
DE 4006242 A1 * 8/1991 .............. E04F 13/08
(Continued)

OTHER PUBLICATIONS

English translation of Japanese Office Action, mailed Oct. 16, 2012, for Japanese Application No. 2012-509027, 3 pages.
(Continued)

*Primary Examiner* — Charles A Fox
*Assistant Examiner* — Charissa Ahmad
(74) *Attorney, Agent, or Firm* — Seed IP Law Group PLLC (57) ABSTRACT

A method of erecting a pylon of a wind power installation is provided. The method includes providing a foundation and placing a plurality of height adjusting units on the foundation. The height adjusting units are made substantially from a plastic material. A load distribution ring is placed on the plurality of height adjusting units. The load distribution ring is straightened and leveled by adjustment of the height adjusting units. A gap between the foundation and the load distribution ring is filled with a grouting material. A pylon segment is placed on the load distribution ring after the grouting material has reached a predetermined strength. The height adjusting units are configured to jointly bear the weight of the load distribution ring, and are configured to yield under a selected load that is greater that a weight of the load distribution ring.

16 Claims, 4 Drawing Sheets

(56) References Cited

U.S. PATENT DOCUMENTS

| | | | |
|---|---|---|---|
| 3,653,169 A | 4/1972 | Jenner | 52/296 |
| 3,713,262 A * | 1/1973 | Jatcko | 52/98 |
| 3,829,540 A * | 8/1974 | Cox | 264/34 |
| 3,838,547 A * | 10/1974 | Meisberger | 52/295 |
| 4,213,509 A | 7/1980 | Häfner | |
| 4,331,314 A * | 5/1982 | Chacour et al. | 248/679 |
| 4,930,270 A * | 6/1990 | Bevacqua | 52/126.1 |
| H906 H | 4/1991 | Baggett et al. | 403/409.1 |
| 5,505,033 A * | 4/1996 | Matsuo et al. | 52/296 |
| 5,595,029 A * | 1/1997 | Revoir et al. | 52/103 |
| 5,678,382 A * | 10/1997 | Naito | 52/745.21 |
| 5,779,388 A | 7/1998 | Yamamoto | 403/405.1 |
| 5,826,387 A | 10/1998 | Henderson et al. | |
| 5,966,882 A * | 10/1999 | Naito | 52/295 |
| 6,141,928 A * | 11/2000 | Platt | 52/296 |
| 7,441,743 B2 * | 10/2008 | Behlinger et al. | 248/679 |
| 7,520,096 B2 * | 4/2009 | Hiraguri et al. | 52/263 |
| 7,614,200 B2 * | 11/2009 | Wobben | 52/741.14 |
| 7,677,522 B2 * | 3/2010 | Bakos | 248/500 |
| 8,220,214 B1 * | 7/2012 | Purdy | 52/296 |
| 2002/0144477 A1 * | 10/2002 | Chen | 52/263 |
| 2003/0196393 A1 * | 10/2003 | Bowman et al. | 52/295 |
| 2006/0137287 A1 | 6/2006 | Svendsen | 52/698 |
| 2007/0065234 A1 | 3/2007 | Jakubowski et al. | |
| 2008/0155907 A1 * | 7/2008 | Wobben | 52/169.13 |
| 2008/0302038 A1 * | 12/2008 | Wobben | 52/296 |
| 2009/0044482 A1 * | 2/2009 | Tooman | 52/699 |
| 2009/0178353 A1 * | 7/2009 | Reyneveld | 52/297 |
| 2009/0272053 A1 * | 11/2009 | Dent | 52/296 |
| 2010/0024311 A1 * | 2/2010 | Wambeke et al. | 52/40 |
| 2011/0041438 A1 * | 2/2011 | Frost | 52/296 |

FOREIGN PATENT DOCUMENTS

| | | | |
|---|---|---|---|
| DE | 103 47 536 A1 | 5/2005 | |
| DE | 698 27 290 T2 | 12/2005 | |
| DE | 10 2004 031 655 A1 | 2/2006 | |
| EP | 1 767 705 A1 | 3/2007 | |
| EP | 2 041 371 B1 | 2/2010 | |
| GB | 2011350 A | 7/1979 | |
| JP | 5419504 * | 2/1979 | |
| JP | 54-101041 A | 8/1979 | |
| JP | 62068928 A * | 3/1987 | E02D 27/44 |
| JP | 03183834 A * | 8/1991 | E04B 1/00 |
| JP | 03191143 A * | 8/1991 | E04B 1/348 |
| JP | 4-27439 B2 | 5/1992 | |
| JP | 04228725 A * | 8/1992 | E02D 27/01 |
| JP | 08209721 A * | 8/1996 | E02D 27/42 |
| JP | 09158215 A * | 6/1997 | E02D 27/44 |
| JP | 09158217 A * | 6/1997 | E02D 27/44 |
| JP | 10121576 A * | 5/1998 | E04B 1/24 |
| JP | 11013135 A * | 1/1999 | E04B 1/24 |
| JP | 2001098565 A | 4/2001 | E02D 27/01 |
| JP | 2002256620 A * | 9/2002 | E04B 1/20 |
| JP | 2011047118 A * | 3/2011 | |
| RU | 95364 U1 | 6/2010 | |
| SU | 1294917 A1 | 3/1987 | |
| WO | WO 03/031733 A1 | 4/2003 | |
| WO | 2005/095717 A1 | 10/2005 | |
| WO | 2005/095792 A1 | 10/2005 | |
| WO | WO 2005/107425 A2 | 11/2005 | |
| WO | 2008/003749 A1 | 1/2008 | |
| WO | WO 2008/003749 A1 | 1/2008 | |

OTHER PUBLICATIONS

Japanese Office Action for corresponding Japanese application No. 2012-509027, mailed on Oct. 27, 2013, with English translation, 7 pages total.

* cited by examiner

METHOD FOR ERECTING A TOWER, AND TOWER

BACKGROUND

1. Technical Field

The present invention concerns a method of erecting a tower or pylon, in particular a pylon of a wind power installation, and a pylon, as well as a wind power installation having such a pylon.

2. Description of the Related Art

In setting up the foundation for a pylon care must be taken to ensure that the top side of the foundation or at least that part of the foundation on which the pylon stands is flat and exactly horizontal so that the pylon stands precisely upright.

WO 2005/095717 discloses an annular concrete form or casing on a foundation of a pylon. The form is filled with a low-viscosity grouting material (grouting mortar) and after the grouting material has set and after removal of a form, a levelling ring or load distribution ring can be placed on the surface of the set grouting material. Then a lower pylon segment can be fixed on that load distribution ring, using anchor screws which are incorporated into the foundation and which project beyond the foundation by a predetermined amount. The low viscosity of the grouting material can ensure that it itself is exactly levelled or flattened.

WO 2005/095792 describes a method of erecting a pylon on a foundation. In that case the pylon is set up by means of anchor screws anchored in segment anchors in the foundation. The anchor screws project beyond the top side of the foundation by a predetermined amount. Firstly a levelling ring or a load distribution ring is levelled out at the top side of the foundation, aligned and fixed. In the state of the art that levelling operation is effected for example in such a way that height adjusting units such as for example height adjusting screws are placed at predetermined positions on the foundation, wherein the load distribution ring firstly rests on the height adjusting screws and the load distribution ring is then levelled off by adjustment of the screws. Then the gap between the foundation and the load distribution ring is filled and the load distribution ring is lined therebeneath over its surface. That is effected with a suitable filling material such as for example grouting mortar.

The height adjusting screws include an outer element having a female screwthread and an inner element having a male screwthread. The inner element is received with that male screwthread in the female screwthread of the outer element and is adjustable in height by being screwed in and out, with respect to the outer element. The load distribution ring can be levelled by a suitable arrangement and adjustment of the height adjusting screws. To achieve good weather resistance and a secure reliable load-carrying capacity such height adjusting screws are made from high-quality steel. Very fine height adjustment is possible by the typical configuration of the screwthread, in the form of a fine screwthread.

Height adjusting screws of that kind are admittedly relatively high in price but they can reliably carry high loads. Therefore, at least three height adjusting screws are required for levelling the load distribution ring, the screws being arranged (distributed equidistantly) over the mean radius of the load distribution ring.

DE 103 47 536 A1 discloses an arrangement for anchoring a pivoting derrick crane. A spacer element which can be squeezed together is provided in that case.

DE 698 27 290 T2 describes a device for adjusting the inclination of the surface of a construction on support legs.

WO 2008/003749 A1 discloses a height adjusting unit in the form of a height adjusting screw for aligning a lower pylon segment. At its underside the height adjusting screw has a pressure distribution element which is soft in comparison with the concrete of the foundation. As an alternative thereto a height adjusting unit is also embodied by two wedges which are displaceable into each other.

BRIEF SUMMARY

Therefore the object of the present invention is to provide a method of erecting a pylon, which permits more reliable and inexpensive erection of a pylon.

That object is attained by a method of erecting a pylon as described below, by a pylon as described below and by a wind power installation as described below.

Thus there is provided a method of erecting a pylon, in particular a pylon of a wind power installation. For that purpose a foundation is provided, a plurality of height adjusting units are placed on the foundation, and a load distribution ring is placed on the plurality of height adjusting units. The load distribution ring is straightened and levelled by adjustment of the height adjusting units and the gap between the foundation and the load distribution ring is filled with a grouting material. After the grouting material has reached a predetermined strength or after setting of the grouting material a pylon segment is placed on the load distribution ring. In that case the height adjusting units are so dimensioned that they (jointly) can reliably carry the weight or the load of the load distribution ring but yield when such a high force acts on one of the plurality of height adjusting units that a surface pressure exceeding a limit value acts due to the height adjusting units on the foundation (that is to say they fail under a predetermined load (weight of the load distribution ring+second weight on the load distribution ring)). The height adjusting units are substantially made of plastic material so that the height adjusting units can be inexpensively produced.

When the gap between the foundation and the levelled load distribution ring is filled with grouting material and the grouting material reaches a predetermined strength, then a large part of the load (load distribution ring +pylon segments) is applied to the foundation by way of the grouting material. Diversion of the loads (load distribution ring+pylon segments) to the foundation by way of the height adjusting units occurs when the load distribution ring is not sufficiently supported by the grouting material in the gap. In such a situation it can happen that the height adjusting units must pass a part of or the entire load to the foundation. The result of that can be that a pressure per unit of surface area is reached in the region below the height adjusting units, which can lead to damage to or destruction of the foundation.

Conventional height adjusting screws of high-quality steel can result in an excessively high pressure in relation to unit of surface area, due to the height adjusting units, on the foundation, by virtue of the higher stiffness of the height adjusting screws with respect to the grouting mortar, and that can lead to damage to the foundation. That load or the surface pressure that it entails can already be reached and exceeded by the first pylon segment, but is reached at the latest by the complete pylon, that is to say the excessive pressure in relation to surface area is caused by a concentration of the flow of the load on the height adjusting units (as a consequence of the higher stiffness thereof). An increase in the number of the known height adjusting units could admittedly generally provide a remedy here, but that increases the costs because the height adjusting units must remain under the load distribution ring until the gap has hardened, and they are thus lost. If however the height adjusting units are to substantially carry the weight of the load distribution ring and are correspondingly of smaller dimensions, then they will fail under the load of the pylon by virtue of the relatively low stiffness. Consequently the load distribution ring rests on the hardened grouting material under the load of the pylon and the entire grouting material gap provides for transmitting the load to the foundation at the intended pressure per unit of area so that damage to the foundation is prevented.

If the load or the weight which acts on the respective height adjusting units exceeds a limit value, then height adjusting units of plastic material can yield. That yielding effect can represent a yielding effect which involves destruction. In accordance with a further aspect of the invention the height adjusting units are in the form of height adjusting screws, in particular with a metric thread. A metric thread is easier and thus less expensive to produce than a fine thread and still permits sufficiently accurate levelling. Height adjustment of the height adjusting units can be ensured in a simple fashion by virtue of the units being in the form of screws.

One example aspect concerns a pylon, in particular of a wind power installation. The pylon has a foundation, a plurality of height adjusting units on the foundation, a load distribution on the plurality of height adjusting units and grouting material in the gap between the foundation and the load distribution ring. The height adjusting units are so dimensioned as to carry substantially the weight of the load distribution ring but yield when such a high force acts on the plurality of the height adjusting units that a pressure in relation to surface area, that exceeds a limit value, acts on the foundation through the height adjusting units.

One example aspect concerns a pylon, in particular of a wind power installation, comprising a foundation, a plurality of height adjusting units on the foundation and a load distribution ring on the plurality of the height adjusting units. The load distribution ring serves to carry a lower pylon segment. The height adjusting units are made from plastic material.

One example aspect concerns height adjusting units for carrying a load distribution ring of a pylon, in particular of a wind power installation. The height adjusting units in that case comprise plastic material.

One example aspect concerns the use of height adjusting units of plastic material for carrying a load distribution ring on a foundation of a pylon, in particular of a wind power installation. The height adjusting units are made in that case of plastic material.

The state of the art involves using height adjusting screws of steel to straighten a levelling ring or a load distribution ring on a foundation. Then the resulting gap is filled for example with a grouting material such as for example Pagel cement. In that case however it can happen that the load of the pylon acting on the load distribution ring is diverted through the height adjusting screws because of inaccuracies in the gap. Therefore it can happen that the concrete of the foundation under the height adjusting units must carry the entire load of the pylon. That can thus result in an unacceptably high pressure in relation to surface area of the foundation in the region under the height adjusting screws. That is particularly disadvantageous if the pressure in relation to surface area reaches inadmissibly high values as that can lead to damage to the foundation. Instead of a uniform distribution of load on the foundation, it happens that the application of load is concentrated at a few locations because of the height adjusting screws in accordance with the state of the art.

According to one example aspect, therefore, there are provided height adjusting units which can admittedly securely bear the weight of the load distribution ring but not the weight of the entire pylon or the weight of an individual pylon segment. The height adjusting units will thus inevitably fail when the pylon is built up. As a result the load of the pylon is distributed uniformly to the grouting material gap and therethrough to the foundation. The height adjusting units according to one example aspect are therefore designed in such a way that they can bear the weight of the load distribution ring but fail at a pressure in relation to surface area, that exceeds a predetermined limit value, that is to say failure of the height adjusting units from a limit value for example for the load or the pressure in relation to surface area is willingly accepted and is even desired.

As the height adjusting units can be used for example in the form of plastic height adjusting screws the foundation can be provided less expensively as the height adjusting units cannot be reused and the plastic height adjusting screws can be produced substantially more favorably than the otherwise usual steel height adjusting screws.

Further configurations of the invention are subject-matter of the appendant claims.

Embodiments by way of example and advantages of the invention are described more fully hereinafter with reference to the drawings.

DETAILED DESCRIPTION

Figure 1:
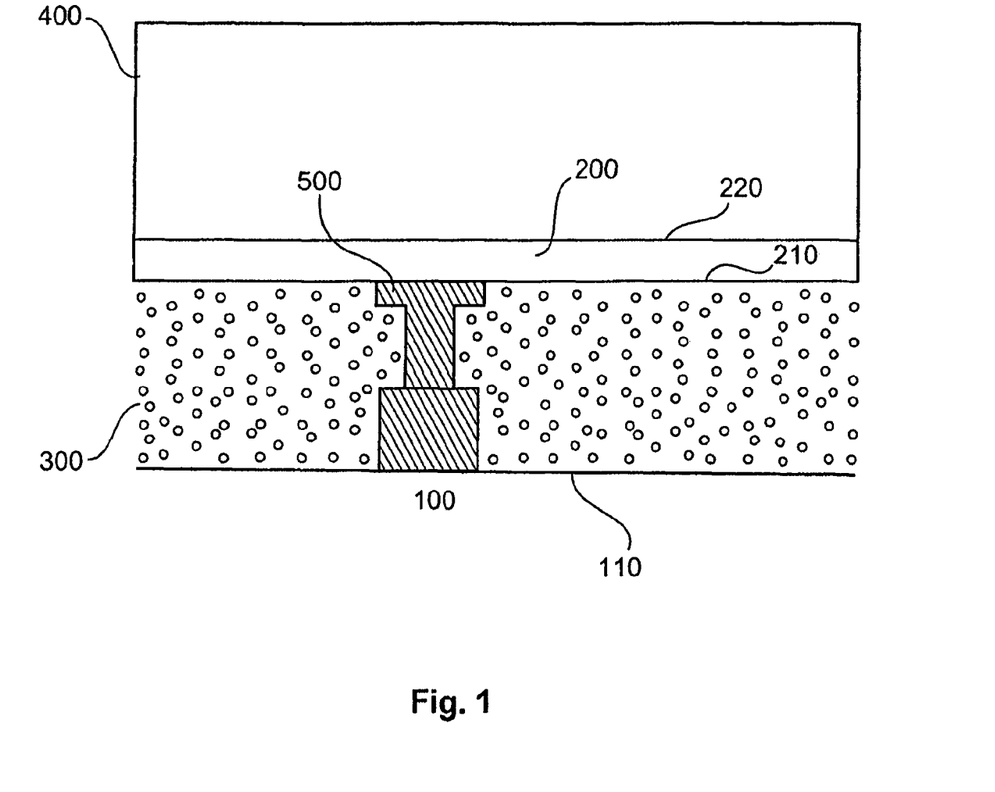
FIG. 1 shows a diagrammatic view of a portion of a foundation and a lower segment of a pylon according to a first embodiment.

FIG. 1 shows a diagrammatic view of a portion of a foundation and a lower segment of a pylon, in particular a pylon of a wind power installation according to a first embodiment. A plurality of height adjusting units 500 are placed on a foundation 100 and in turn a levelling ring or load distribution ring 200 placed on the height adjusting units 500. The load distribution ring 200 can be exactly straightened or levelled by means of the height adjusting units 500. Grouting material (a so-called grouting mortar) 300 is introduced into the gap between the top side 110 of the foundation 100 and the underside 110 of the load distribution ring 200. In that case the load distribution ring 200 should be underlain completely and without air inclusions or cavities so that the load of the tower, acting on the load distribution ring, can be passed to the foundation 100 over the entire surface of the grouting material. In other words, there should no longer be any intermediate space between the grouting material 300 and the top side 110 of the foundation 100 and the underside 210 of the levelling ring 200.

A lower pylon segment 400 can be placed and fixed on the load distribution ring 200. Further fixing elements can possibly be provided between the load distribution ring 200 and the lower pylon segment 400.

When after hardening of the grouting material 300 a lower pylon segment 400 is fixed on the load distribution ring 200 or further pylon segments are fixed on the lower pylon segment 400, then the weight or the load acting on the grouting material gap and the height adjusting units 500 increases. In that case it can happen that the grouting material 300 is compressed. If however the grouting material 300 is compressed more greatly because of its lower stiffness than the height adjusting unit 500, it can then happen that the application of force or load from the load distribution ring 200 to the foundation 100 takes place no longer by way of the grouting material 300 but substantially by way of at least some of the height adjusting units 500 (as is the case with the height adjusting screws of high-quality steel in accordance with the state of the art). If however the distribution of load is concentrated on the height adjusting units 500, then a pressure in relation to surface area can be applied to the foundation below the height adjusting units 500, which exceeds the admissible limit value so that the foundation can be damaged under the height adjusting unit 500.

The height adjusting units 500 are preferably in the form of height adjusting screws and can be made for example from plastic material (HDPE). In that case the height adjusting units are so designed that they are admittedly capable of reliably carrying the weight of the load distribution ring 200 but, upon the attainment of a limit value in respect of a load or a pressure in relation to surface area, that is to say when for example a pylon segment is placed on the load distribution ring, the height adjusting units fail or yield or are at least damaged so they cannot carry any weight. In that situation the load can no longer be transferred from the pylon to the foundation via the height adjustment units 500. However the grouting material 300 is provided between the top side 110 of the foundation and the underside 210 of the load distribution ring 200, therefore the load of the pylon can be uniformly carried by that grouting material 300 and transmitted to the foundation 100 at a uniform pressure in relation to the entire surface area which is intended and which is not harmful to the foundation.

The above-described dimensioning or configuration of the height adjusting units 500 is therefore so selected that collapse or failure of the height adjusting units 500 is willingly tolerated or is caused deliberately by virtue of the design configuration thereof in order to avoid an inadmissibly high pressure in relation to surface area in the region of the foundation below the height adjusting units 500 as in the state of the art. It will be appreciated that in that respect standardized dimensioning is possible so that a height adjusting unit 500 according to the invention can reliably bear for example a weight of up to for example 350 kg. The weight of the load distribution ring then determines the required number of height adjusting units 500 for that load distribution ring 200, in which respect it will be noted however that at least three height adjusting units 500 are always used to ensure a stable position for the load distribution ring. With three height adjusting units 500, a load distribution ring of 1t in weight could be levelled with the carrying force of 350 kg. For example HD polyethylene can be used as the material for the height adjusting unit, or another preferably thermoplastic or injection-moldable plastic material.

The fact that the height adjusting units 500 are in the form of height adjusting screws of plastic material is also advantageous in regard to the material costs of the height adjusting units 500. As the height adjusting units 500 can no longer be removed after the grouting material 300 has been filled they can therefore also not be re-used.

With the height adjusting units 500 according to the invention, it is possible to achieve improved load distribution to the foundation 100 of the pylon upon partial failure of the grouting material 300 and in addition it is possible to achieve a reduction in cost for the foundation 100 and the height adjusting units 500. In that case the height adjusting unit 500 can be implemented in the form of a height adjusting screw with a metric thread.

Figure 2:
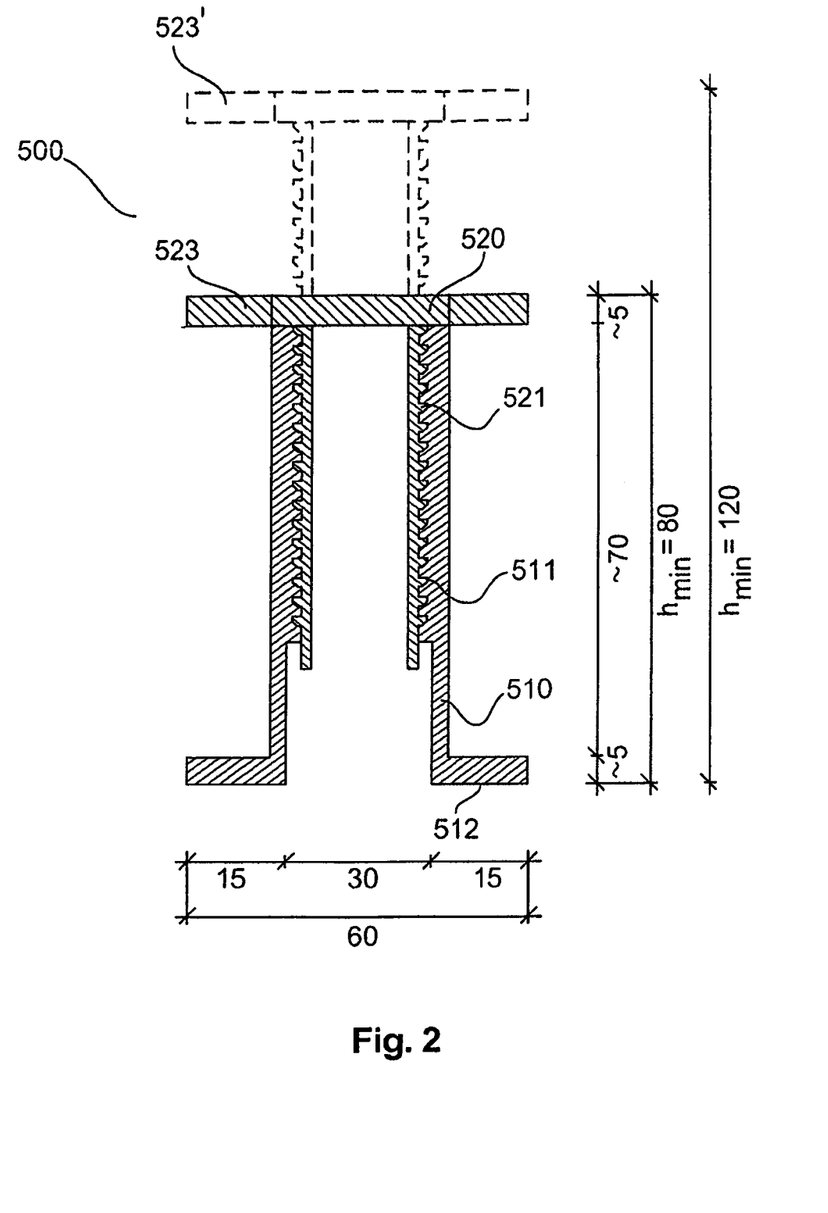
FIG. 2 shows a diagrammatic cross-section of a height adjusting unit according to a second embodiment.

FIG. 2 shows a diagrammatic sectional view of a height adjusting unit according to a second embodiment. The height adjusting unit 500 according to the second embodiment can be used for example as a height adjusting unit in the first embodiment. The height adjusting unit 500 is preferably in the form of a height adjusting screw. In that case the height adjusting unit 500 has an outer element 510 and an inner element 520. The outer element 510 has feet 512 or alternatively in place of the feet 512 a base ring (not shown) or as a further alternative a base plate (also not shown) as well as a female screwthread 511. The inner element 520 has a male screwthread 521 and an upper element 523. That upper element 523 is shown in broken line in the Figure in a higher position into which it can be moved by unscrewing. In that position the upper element is denoted by reference 523'. The male screwthread 521 of the inner element 520 is in that case naturally complementary to the female screwthread 511 of the outer element 510.

The feet 512 or the base ring (not shown) or the base plate (also not shown) are placed on the surface 110 of the foundation 100 and transmit the flow of load to the foundation while the upper element 523, 523' serves to receive the load distribution ring 200. The height of the height adjusting unit can be adjusted by rotation of the inner element 520. In that case the height can be set for example between 80 and 120 mm. It will be appreciated that other ranges, such as for example 50 to 90 mm, are also possible, depending on the structural configuration of the height adjusting unit.

The upper element 523, 523' of the inner element 520 can be polygonal so that the height adjusting screw can also be actuated in situ, that is to say in the position of installation beneath the load distribution ring 200 (not shown in this Figure) by a suitable tool such as for example a fixed spanner or an open-end wrench to easily permit levelling of the load distribution ring 200.

Failure or yielding of the height adjusting units in accordance with the first or second embodiment under a weight or a load above a limit value (or a pressure in relation to surface area above the limit value) involves damage to, impairment of and/or destruction of the height adjusting units, in particular the height adjusting screws. In that case for example the screwthread of the height adjusting screws can be damaged, which can lead to failure of the function or yielding of the height adjusting screws.

The height adjusting unit according to the invention can bear for example a maximum loading of 0.5-0.7 t. A load distribution can have for example a weight of 900 kg to 4000 kg (in dependence on a pylon variant).

Figure 3A:
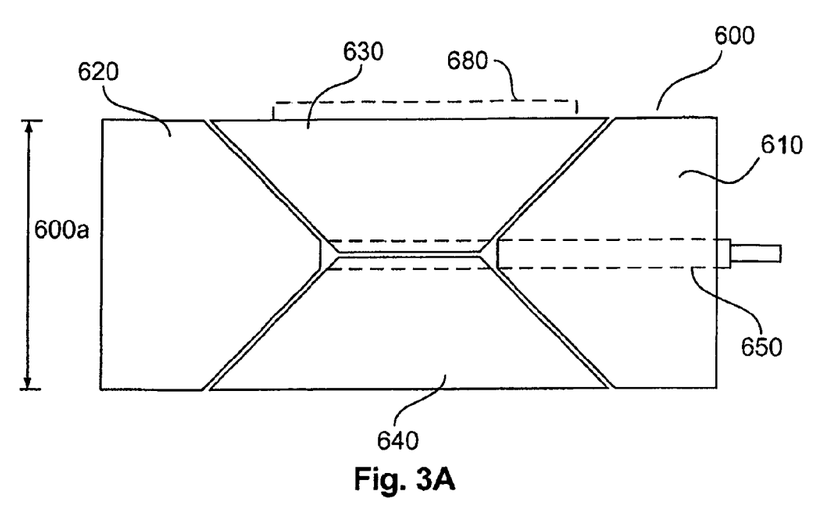
FIGS. 3A and 3B show a diagrammatic cross-section of a height adjusting unit according to a third embodiment.
Figure 3B:
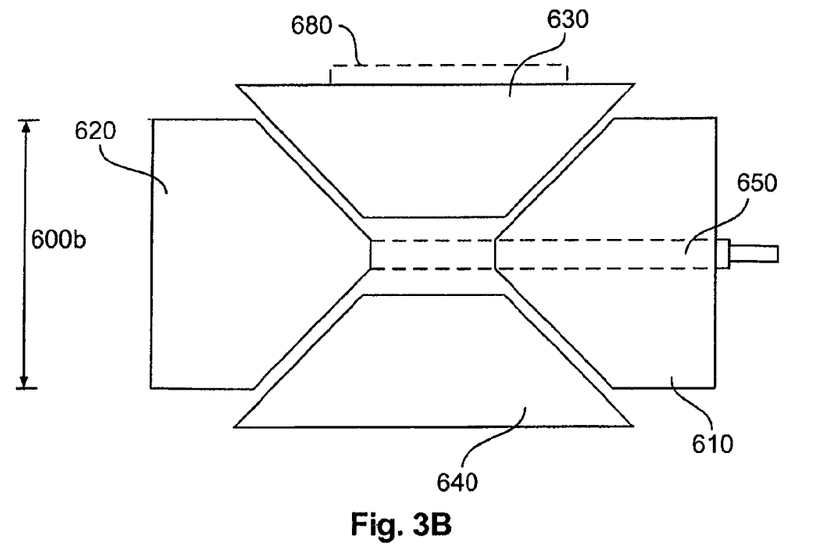

FIGS. 3A and 3B each show a respective diagrammatic cross-section of a height adjusting unit according to a third embodiment. FIG. 3A shows the height adjusting unit 600 at a first height 600a. That height represents the minimum height of the height adjusting unit 600. The height adjusting unit 600 of the third embodiment has a first and second portion of trapezoidal cross-section (trapezoidal portion) 630, 640 which are respectively arranged in opposite relationship with their smaller sides. The height adjusting unit 600 further has a first and a second wedge portion 610, 620. The first and second wedge portions 610, 620 respectively engage into the first and second trapezoidal portions 630, 640. The height adjusting unit 600 of the third embodiment also has an adjusting unit 650 by means of which the spacing between the first and second wedge portions 610, 620 can be adjusted.

FIG. 3B shows a situation in which the two wedge portions 610, 620 are provided closer together by means of the adjusting unit 650, that is to say the spacing between the first and second wedge portions 610, 620 has been reduced. Due to the reduced spacing between the first and second wedge portions 610, 620 the first and second trapezoidal portions 630, 640 are urged upwardly and downwardly respectively so that the height 600B of the height adjusting unit 600 is greater than the minimum height 600a shown in FIG. 3A. Thus in the third embodiment there is provided a height adjusting unit which, by actuation of the adjusting unit 650, can vary the spacing between the first and second wedge portions 610, 620 and can thus urge the first and second trapezoidal portions 630, 640 upwardly and downwardly respectively so that the height of the height adjusting unit 600 can be increased or reduced.

The height adjusting unit 600 of the third embodiment with the first and second wedge portions 610, 620 and the first and second trapezoidal portions 630, 640 is made from plastic material.

Accordingly the height adjusting unit of the third embodiment, like the height adjusting units of the first or second embodiment, can yield under a weight or a load above a limit value. That yielding effect can be a yielding effect which involves destruction.

Figure 4A:
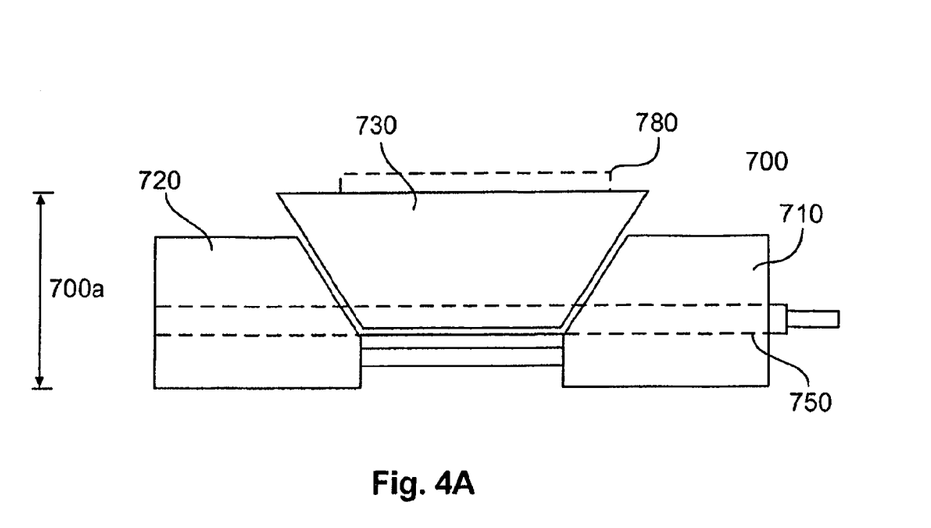
FIGS. 4A and 4B show a diagrammatic cross-section of a height adjusting unit according to a fourth embodiment.
Figure 4B:
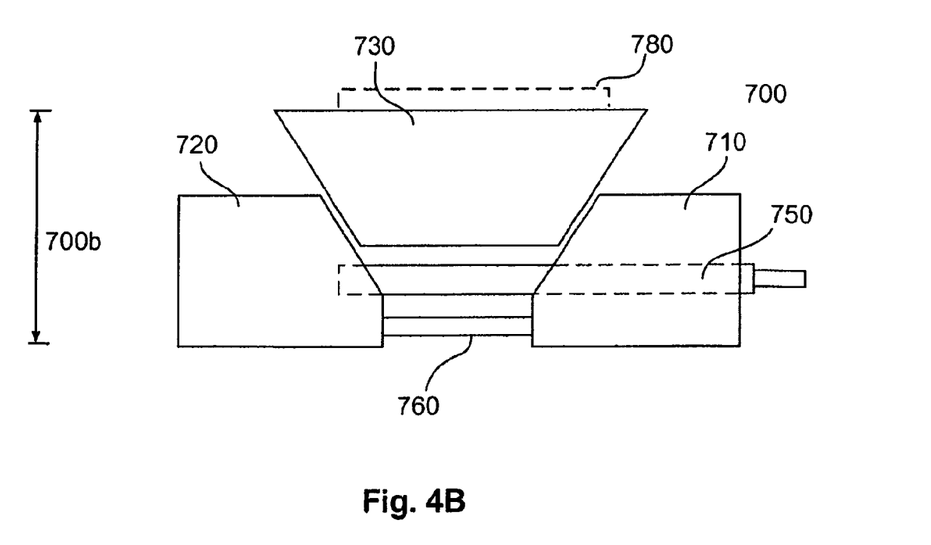

FIGS. 4A and 4B each show a diagrammatic cross-section of a height adjusting unit according to a fourth embodiment. The height adjusting unit 700 in the fourth embodiment has a first trapezoidal portion or trapezium portion 730 and a first and second wedge portion 710, 720. The first and second wedge portions 710, 720 can be connected together by way of an adjusting unit 750 in such a way that the spacing between the first and second wedge portions 710, 720 is variable. FIG. 4A shows a height 700a of the height adjusting unit, that corresponds to the minimum height.

FIG. 4B shows the height adjusting unit of the fourth embodiment, wherein the spacing between the two wedge portions 710, 720 has been reduced in comparison with the spacing shown in FIG. 4A. Thus the trapezoidal portion 730 is urged upwardly by the first and second wedge portions 710, 720 so that the height 700b of the height adjusting unit 700 is increased.

The height adjusting unit of the fourth embodiment can also yield like the height adjusting unit of the first, second or third embodiment when a limit value of a load or a weight is exceeded. That yielding effect can also represent a yielding effect involving destruction.

The adjusting unit of the third and fourth embodiments can be in the form of a screw element.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of erecting a pylon of a wind power installation, comprising:
 providing a foundation;
 placing a plurality of height adjusting units on the foundation, the height adjusting units including an upper element having a flat upper surface and lower element having a flat lower surface, the upper element being coupled to the lower element, wherein placing the plurality of height adjusting units on the foundation includes placing the flat lower surface of the lower element on the foundation, the height adjusting units being made substantially from a plastic material;
 placing a load distribution ring on the flat upper surface of the upper element of the plurality of height adjusting units, the flat upper surface of the upper element being located between the load distribution ring and an upper most surface of the lower element, wherein the height adjusting units are configured to jointly bear the weight of the load distribution ring, and are configured to yield under a selected load that is substantially greater than a weight of the load distribution ring;
 straightening and leveling the load distribution ring by adjustment of the height adjusting units;
 after the straightening and leveling of the load distribution ring, filling a gap between the foundation and the load distribution ring with a grouting material;
 placing a pylon segment of the pylon on the load distribution ring after the grouting material has reached a predetermined strength;
 placing a plurality of pylon segments on the pylon segment placed on the load distribution ring; and
 crushing the height adjusting units to reduce a height of the height adjusting units under a combined weight of the plurality of pylon segments, causing the weight of the pylon segments to be carried by the grouting material and transferred to the foundation substantially by the grouting material.

2. The method according to claim 1, wherein the upper element threadedly couples with the lower element.

3. The method according to claim 1, wherein the height adjusting units are made substantially from high-density polyethylene.

4. The method according to claim 1, wherein the selected load is less than a combined weight of a plurality of pylon segments placed on the load distribution ring and the load distribution ring.

5. The method according to claim 1, wherein placing a pylon segment of the pylon on the load distribution ring comprises placing a plurality of pylon segments on the load distribution ring.

6. The method of claim 1, wherein the upper element has a portion that is located inside of the lower element.

7. A method of erecting a pylon of a wind power installation, comprising:
 placing flat ends of lower elements of a plurality of plastic height adjusting units directly on a foundation;
 placing a load distribution ring directly on ends of an upper inner element of the plurality of height adjusting units without portions of the height adjusting elements extending therethrough;
 leveling the load distribution ring by adjustment of the height adjusting units;
 filling a gap between the foundation and the load distribution ring with a grouting material;
 curing the grouting material;

placing a plurality of pylon segments on the load distribution ring; and crushing at least one of the height adjusting units under a combined load of the plurality of pylon segments and the load distribution ring to cause the combined load of the plurality of pylon segments and the load distribution ring to be substantially carried by the grouting material and transmitted to the foundation.

8. The method according to claim 7, wherein crushing at least one of the height adjusting units comprises crushing each of the height adjusting units.

9. The method according to claim 7, wherein the height adjusting units comprise a plastic material.

10. The method of claim 7, wherein the lower element having threads that couple with threads of the upper element.

11. The method of claim 10, wherein the lower element is an outer element and the upper element is an inner element that has a portion within the lower element.

12. A pylon of a wind power installation, comprising:
a foundation;
a load distribution ring having a lower surface;
a plurality of pylon segments mounted on the load distribution ring;
a grouting material located in a gap between the foundation and the load distribution ring; and
a plurality of height adjusting units having a lower element and an upper element that adjustably couples with the lower element, the lower element having a bottom surface that contacts the foundation and the upper element having an upper surface that contacts the load distribution ring, the upper surface of the upper element being located above the upper most surface of the lower element, the plurality of height adjusting units being configured to change from a first state to a second state, in the first state the height adjusting units are configured to level the load distribution ring, in the second state the height adjusting units have been crushed under a combined load of the plurality of pylon segments and the load distribution ring to cause the combined load of the plurality of pylon segments and the load distribution ring to be carried by the grouting material and transmitted to the foundation.

13. The pylon according to claim 12, wherein the height adjusting units comprise high-density polyethylene.

14. The pylon according to claim 12, wherein the height adjusting units are height adjusting screws.

15. The pylon according to claim 12, wherein the upper element includes threads that mate with threads on an inner surface of the lower element.

16. The pylon according to claim 12, wherein the upper surface of the upper surface of the upper element is located between the load distribution ring and the upper most surface of the lower element.

* * * * *